(No Model.) 2 Sheets—Sheet 2.
B. REAHR.
ICE CREAM FREEZER.
No. 269,710. Patented Dec. 26, 1882.
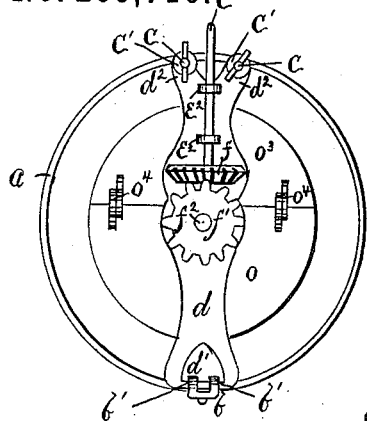
Fig 3
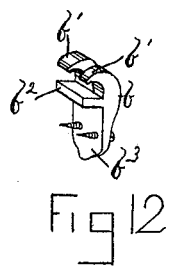
Fig 12
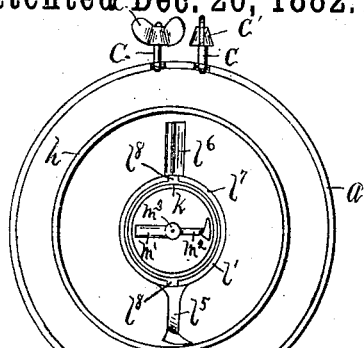
Fig 4
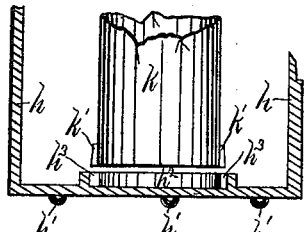
Fig 10
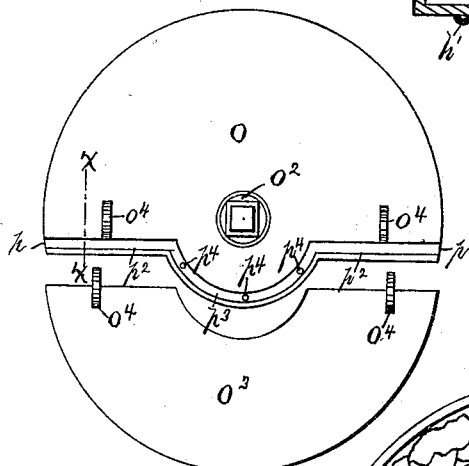
Fig 5
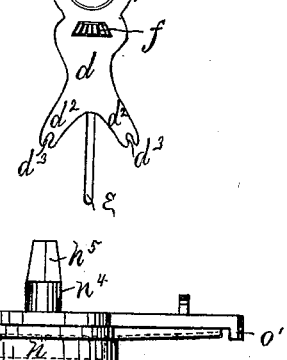
Fig 11
Fig 13
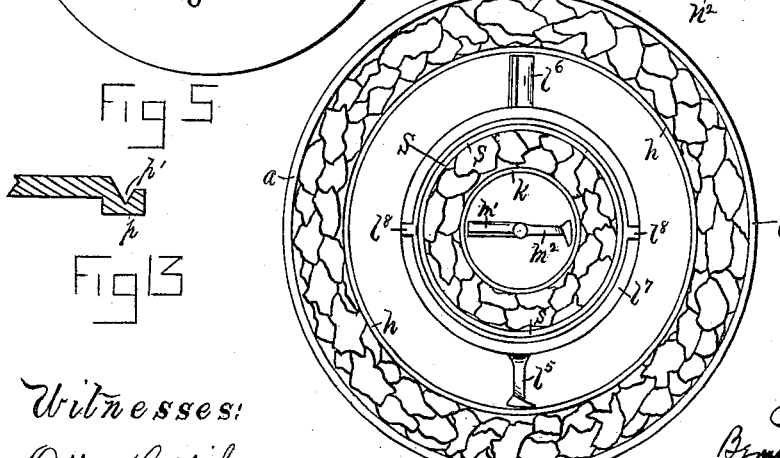
Fig 14
Witnesses:
Otto Hoddick
Wm. W. Kent
Inventor:
Bernhard Reahr
By W. F. Miller
Atty

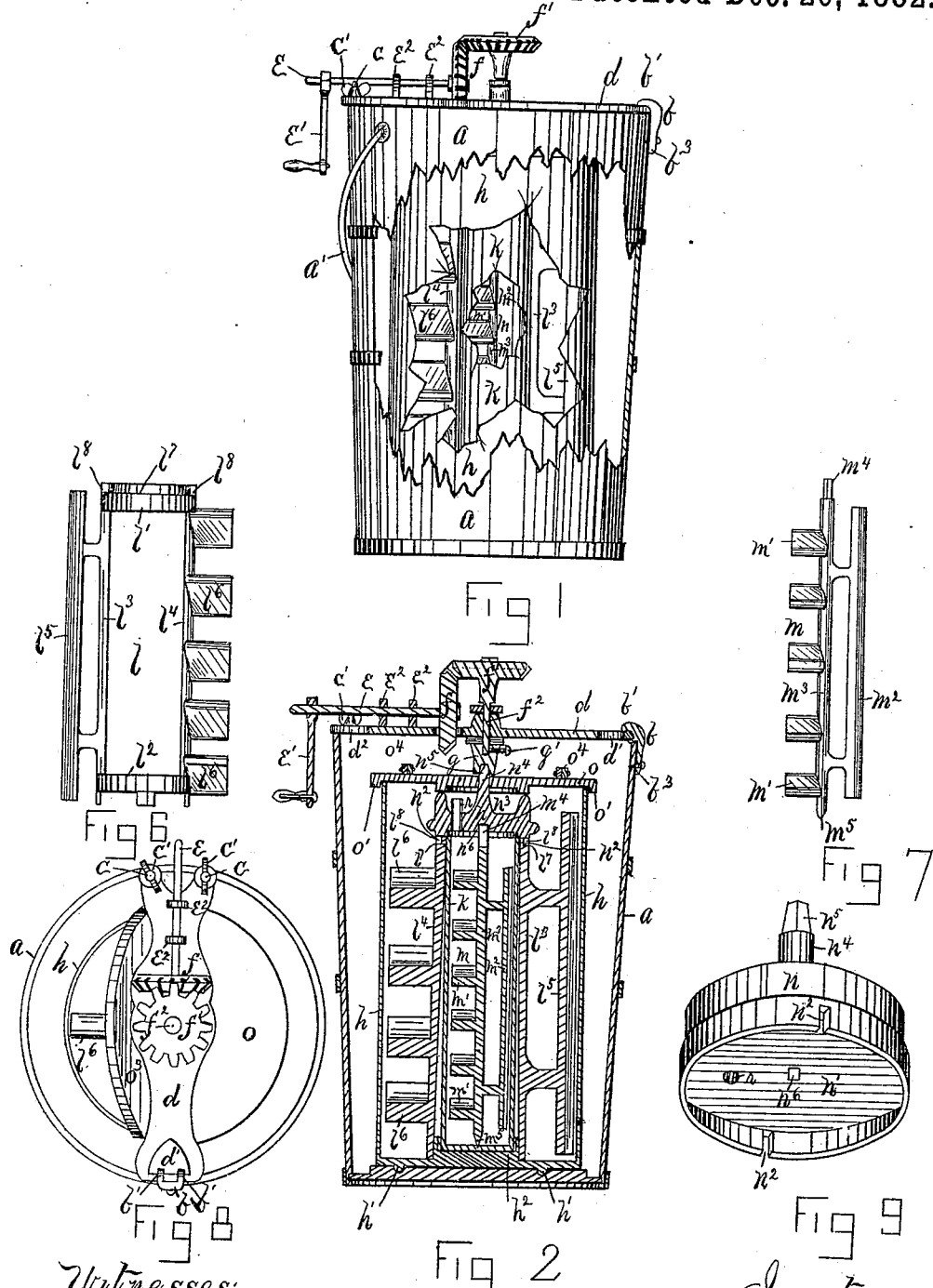

UNITED STATES PATENT OFFICE.

BERNHARD REAHR, OF BUFFALO, NEW YORK, ASSIGNOR OF ONE-HALF TO GEORGE N. PIERCE, OF SAME PLACE.

ICE-CREAM FREEZER.

SPECIFICATION forming part of Letters Patent No. 269,710, dated December 26, 1882.

Application filed October 7, 1882. (No model.)

*To all whom it may concern:*

Be it known that I, BERNHARD REAHR, a citizen of the United States, residing at Buffalo, in the county of Erie and State of New York, have invented certain new and useful Improvements in Ice-Cream Freezers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention consists in certain improvements in ice-cream freezers, as follows: first, an improved freezer in which more than one kind of ice-cream can be made at the same time; second, an improved freezer in which the state of the cream being frozen can be ascertained at any time during the operation of freezing without stopping or interfering in any manner with such operation; third, an improved freezer in which the surface of contact of the freezing medium is nearly double that of any of the freezers now in use for the same quantity of cream to be frozen; and, fourth, certain improved details of construction, which will be more fully hereinafter set forth and claimed.

In the drawings, Figure 1 is an elevation of the freezer complete with portions broken away to show the interior construction. Fig. 2 is a central vertical section of Fig. 1. Fig. 3 is a top plan view of the freezer. Fig. 4 is a top plan view of the freezer with the crank, its shaft, and the operating cog-wheels thrown back out of the way and the hinged cover of the freezer removed. Fig. 5 is a top view of the cover and its hinged portion separated. Figs. 6 and 7 are separate views of the stirring and scraping devices. Fig. 8 is a top plan view of the freezer with the hinged cover thrown open. Figs. 9, 10, 11, and 12 are other detail views. Fig. 13 is a partial section of the cover, taken in the line $x\ x$, Fig. 5; and Fig. 14 is a plan view of a modified form of freezer.

Referring to the drawings, $a$ is the usual pail which holds the freezing apparatus, and upon the upper edge of which is adjustably and removably secured the operating mechanism, and $a'$ is the carrying-handle. This operating mechanism, by means of which the stirring and scraping devices are rotated, is arranged substantially as follows: Upon the top edge of the pail is secured the open pivot $b$, (more clearly shown in Fig. 12,) in which the curved lugs $b'\ b'$ and shoulder $b^2$ form the seat in which one end of the plate carrying the operating mechanism is adjustably and removably located. The under face of the shoulder $b^2$ rests upon the upper edge of the pail, and the extension $b^3$ is secured by nails or screws to the side of the pail. At a point diametrically opposite to this open pivot are attached two swinging rods, $c\ c$, upon whose screw-threaded ends are placed the thumb-nuts $c'\ c'$, to be referred to hereinafter. $d$ is the plate which carries the operating mechanism, having at one end the opening $d'$, which adapts it to be placed in and swung upon the open pivot $b$. At the other end of the plate are the two wings $d^2\ d^2$, having the notches $d^3\ d^3$ for the reception of the swinging rods $c\ c$, which, with the thumb-nuts $c'\ c'$, serve to secure the plate $d$ firmly in position upon the pail.

$e$ is a horizontal shaft, which is revolved by means of the crank $e'$ in the lugs $e^2\ e^2$ upon the plate $d$. Upon the inner end of the shaft $e$ is secured the vertical cog-wheel $f$, which meshes with the horizontal cog-wheel $f'$, secured to the vertical shaft $f^2$. This shaft $f^2$ passes down loosely through an opening in the center of the plate $d$, and is removably secured against vertical displacement by means of the double socket-piece $g$, into the upper socket of which the end of the shaft $f^2$ is secured by set-screw $g'$. This double socket-piece $g$ revolves with the cog-wheel $f'$, and by means of its lower socket the stirring and scraping devices are operated in a manner which will be hereinafter described.

$h$ is the large cylindrical can or compartment in which is placed the stirring and scraping or agitating devices and the smaller interior compartment. This can or compartment $h$ is removably secured from revolving in the pail by means of the buttons $h'$ $h'$, two or more, which rest in corresponding recesses in the bottom of the pail $a$. The bottom of this compartment $h$ is provided with the circular seat $h^2$, (see Fig. 10,) having the inner recesses, $h^3$ $h^3$. $k$ is the smaller cylindrical can or compartment, having at its bottom the outside lugs, $k'$ $k'$, which, when the compartment $k$ is in position, rest in the recesses $h^3$ $h^3$ of the circular seat $h^2$. It will be seen by the foregoing description that both of these cylindrical compartments can be easily and quickly removed, but are prevented, when in position, from revolving during the freezing operation. The smaller compartment, $k$, is intended for the reception of one kind of cream, and the space between it and the larger compartment, $h$, is similarly intended for the reception of a different kind of cream, both of which can be frozen by one and the same operation; or, if desired, the smaller compartment, $k$, can be filled with the freezing medium, as well as the space between the large compartment, $h$, and the pail $a$, thus making the surface of contact of the freezing medium nearly double that of the ordinary freezer for the same quantity of cream to be frozen. If acid is employed as a freezing medium in the can $k$, such can should be made of glass or other non-corrosive material.

The stirring and scraping or agitating devices for the compartments $h$ and $k$ are shown separately in Figs. 6 and 7. $l$, Fig. 6, is the one intended for the space between the two compartments. It consists of two circular rims, $l'$ and $l^2$, connected by the side bars, $l^3$ and $l^4$, which not only serve as a part of the framework, but additionally perform the function of scrapers upon the outer surface of the small compartment, $k$. Upon the bar $l^3$ is the scraper $l^5$, of usual construction, which removes the adhering cream from the inner surface of compartment $h$. Upon the bar $l^4$ are located the stirrers $l^6$, of usual construction, which serve in their revolution to agitate the freezing cream. The outer surface of the top of the circular rim $l'$ is cut away slightly to form the shoulder $l^7$, and upon this shoulder $l^7$ are formed the lugs $l^8$ $l^8$, the purpose of which will be hereinafter explained.

$m$ (see Fig. 7) is the stirring and scraping device, of usual construction, for the compartment $k$. It has the stirrers $m'$ $m'$ and scraper $m^2$, both located upon the central bar, $m^3$. The upper end, $m^4$, of the bar $m^3$ is made square to fit into a socket, as will more fully hereinafter appear, and the lower end, $m^5$, is made tapering, so as to revolve in a corresponding socket in the bottom of the compartment $k$.

Each of the agitators $l$ and $m$ can be cast in one piece, and the metal from which they are formed may be galvanized to prevent rusting.

The stirring and scraping devices, when in position in their respective compartments, are caused to revolve by the following means:

$n$ (see Figs. 2, 9, and 11) is a circular connecting-piece, which communicates power from the double socket-piece $g$ to the stirring and scraping devices $l$ and $m$. It has a circular recess, $n'$, (see Fig. 9,) in its bottom portion, and in the walls of such recess are two slots, $n^2$, placed diametrically opposite each other. This connecting-piece $n$ is placed upon the shoulder $l^7$ of the top circular rim, $l'$, of the stirring and scraping device $l$, the lugs $l^8$ $l^8$ resting in the slots $n^2$ of the connecting-piece $n$. The upper portion of the part $n$ is formed into a cup, $n^3$, from the center of which rises the shaft $n^4$, having the square end $n^5$. This end $n^5$ fits into the lower socket of the double socket-piece $g$, and the revolution of this portion $g$ causes, as will clearly be seen, the revolution of the stirring and scraping device $l$ without causing the revolution of the compartment $k$, the upper end of which fits loosely in the circular recess $n'$. The upper square end, $m^4$, of the stirrer and scraper $m$ fits into a corresponding recess, $n^6$, in the bottom of the part $n$, causing the revolution of this stirrer and scraper.

It will be clearly seen from the foregoing description that the stirrers and scrapers have rotary motion imparted to them simultaneously, while the compartments $h$ and $k$ remain stationary.

$o$ is a cover for the compartment $h$, which is kept in place upon such compartment by means of the circular flange $o'$. This cover is provided with the central opening, $o^2$, for the reception of the shaft $n^4$ of the part $n$, and has the hinged portion $o^3$, which is shown in Fig. 8 in open position, exposing the interior of the compartments $h$ and $k$, and in Fig. 5 in detached position. The two parts are hinged together by means of the lugs $o^4$. This hinged cover permits of an inspection of the cream being frozen without interferring with the operation of the stirrers and scrapers, as clearly shown in Fig. 8.

A sliding section might be used instead of the hinged section $o^3$.

The following means are employed to prevent any of the freezing medium—such as the salt—from passing down between the portions $o$ $o^3$ of the cover and into the cream: The edge of the portion $o$ which abuts against the part $o^3$ is provided with the flange $p$, (see Fig. 5,) a section of which is shown in Fig. 13. This flange $p$ has the groove $p'$ extending through its entire length, and the straight portions $p^2$ $p^2$ are inclined downwarldy toward the circular portion $p^3$, as shown in dotted lines in Fig. 11, which figure represents a front elevation of the portion $o$ with the part $o^3$ removed and the circular connecting portion $n$ in its relative position to the cover. The circular portion $p^3$ of the groove is provided with the holes $p^4$ $p^4$, two or more, which pass down through the cover immediately over the cup $n^3$ in the part $n$, so that any foreign substance in a liquid state which passes through these holes $p^4$ is caught and held in the cup $n^3$.

$r$ is a vertical orifice in the portion $n$ to permit of the escape of vapors, &c., from the compartment $k$. This orifice $r$ is continued upward a sufficient distance, as shown in Fig. 2, to prevent the contents of the cup $n^3$ from passing into the compartment $k$.

A modification of my invention is shown in Fig. 14, in which I have provided an additional can, $s$, placed in the compartment $h$ and surrounding the compartment $k$, the space between which and the compartment $k$ being adapted for the reception of ice and salt or other freezing medium, the stirrers and scrapes, together with the other parts of the freezer, being substantially the same as has been hereinbefore described.

My improved freezer, as has been shown and described, consists of parts which are all removably connected, thus enabling it to be readily put together for freezing purposes, and as readily taken apart to remove the frozen cream and for cleansing purposes.

The adjustment and operation of the freezer are briefly as follows: The cans or compartments $h$ and $k$ are first placed in position in the pail and filled with the different creams to be operated upon. The stirrers and scrapers $l$ and $m$ are next inserted in their respective spaces. The circular connecting-piece $n$ is placed in engagement with the stirrers and scrapers. The cover $o$ $o^3$ is placed over the compartments and the portion $n$, the central shaft, $n^4$, of which passing loosely through such cover, after which the plate $d$ and its operating mechanism are swung over until the lower socket in the double socket-piece is in engagement with the end $n^5$ of the shaft $n^4$, in which position it and all the several parts of the freezer are held securely in position by means of the swinging rods $c$ $c$ and thumb-nuts $c'$ $c'$. The freezing medium having been added, the freezer is put in operation by turning the handle $e'$, which serves, with the intervening mechanism, to rotate the two stirrers and scrapers, while the cans or compartments remain stationary.

What I claim as of my invention is—

1. An ice-cream freezer having a nest of two or more cans or compartments provided with independent agitators, in which more than one kind of cream can be frozen at the same time and by the same operating device, substantially as shown and described.

2. An ice-cream freezer in which the cover for the stationary can or cans holding the cream or creams to be frozen is provided with an adjustable section so arranged as to permit an inspection of the cream during the freezing operation without interrupting such operation, substantially as shown and described.

3. An ice-cream freezer having two cans or compartments, one within the other, the inner one being adapted for the reception of a freezing medium, the space between the inner and outer cans being intended for the cream to be frozen, the outer surface of the larger can being surrounded by a freezing medium, substantially as shown and described.

4. An ice-cream freezer having a cover for the stationary can or cans holding the cream or creams to be frozen, having an adjustable section, as shown and described, and provided with means for catching and retaining any of the freezing medium which may pass through and below such cover, substantially as shown and described.

5. In an ice-cream freezer, the combination, with the cans or compartments $h$ and $k$, arranged, as shown, in the pail $a$, and their cover, of the separate agitating devices $l$ and $m$, both rotated by the same agitating device, substantially as shown and described.

6. In an ice-cream freezer, in combination, the cans or compartments $h$ and $k$, having in common a removable cover, the agitators $l$ and $m$, and the circular connecting device $n$, adapted, as shown, to engage with and rotate the agitators $l$ and $m$, the connecting device $n$ being in turn rotated by suitable power, substantially as shown and described.

7. In an ice-cream freezer, in combination, the cans or compartments $h$ and $k$, having in common a removable cover, the agitators $l$ and $m$, the circular connecting device $n$, adapted, as shown, to engage with and rotate the agitators $l$ and $m$, the double socket-piece $g$, and the removable and adjustable plate $d$, carrying the operating mechanism, all combined and operating substantially as shown and described.

8. In an ice-cream freezer, the agitator $l$, having the top and bottom circular rims, $l'$ $l^2$, and the side connecting-bars, $l^3$ and $l^4$, the bar $l^3$ carrying the scraper $l^5$ and the bar $l^4$ carrying the agitators $l^6$ $l^6$, the top rim, $l'$, being adapted for engagement with a rotating medium, substantially as shown and described.

9. In an ice-cream freezer, the circular connecting device $n$, having the recess or cup $n^3$ and the shaft $n^4$ in its upper portion, and the circular recess $n'$, with its slots $n^2$ $n^2$ and socket $n^6$, substantially as and for the purpose stated.

10. In an ice-cream freezer, the circular connecting device $n$, having the recess or cup $n^3$ and the shaft $n^4$ in its upper portion, and the circular recess $n'$, with its slots $n^2$ $n^2$, socket $n^6$, and orifice $r$ passing up into the recess $n^3$, substantially as and for the purpose stated.

11. In an ice-cream freezer, the cover $o$, having the hinged section $o^3$, the part $o$ being provided with the flange $p$, having the recess or groove $p^2$ $p^3$ and the perforations $p^4$ $p^4$, substantially as and for the purpose stated.

12. In an ice-cream freezer, the combination, with the pail $a$, provided with the open pivot $b$ and swinging rods $c$ $c$, and thumb-nuts $c'$ $c'$, of the plate $d$, having the recess $d'$ at one end and the notches $d^3$ $d^3$ at the other, the plate $d$ carrying the operating mechanism, arranged thereon as shown, the whole operating as and for the purpose stated.

13. An ice-cream freezer consisting of the following instrumentalities, viz.: the pail $a$, having upon its top edge the open pivot $b$ and the swinging rods $c$ $c$, with their thumb-nuts $c'$ $c'$, the removably-adjustable plate $d$, carrying the actuating mechanism, as shown and described, the double socket-piece $g$, the cover $o$ $o^3$, the circular connecting-piece $n$, the stirrers and scrapers $l$ and $m$, and the cans or compartments $h$ and $k$, all combined and operating in the manner shown and described.

In testimony whereof I have signed my name to this specification in the presence of two subscribing witnesses.

BERNHARD REAHR.

Witnesses:
OTTO HODDICK,
W. T. MILLER.